United States Patent
Keh et al.

(10) Patent No.: US 12,173,440 B2
(45) Date of Patent: Dec. 24, 2024

(54) TEXTILE SEPARATION METHODS

(71) Applicant: The Hong Kong Research Institute of Textiles and Apparel Limited, Hong Kong (CN)

(72) Inventors: Edwin Yee Man Keh, Hong Kong (CN); Lei Yao, Hong Kong (CN); Alex Chan, Hong Kong (CN); Un Teng Lam, Hong Kong (CN); Shi Gao, Hong Kong (CN)

(73) Assignee: The Hong Kong Research Institute of Textiles and Apparel Limited, Hong Kong (CN)

(*) Notice: Subject to any disclaimer, the term of this patent is extended or adjusted under 35 U.S.C. 154(b) by 599 days.

(21) Appl. No.: 17/484,249

(22) Filed: Sep. 24, 2021

(65) Prior Publication Data
US 2023/0147533 A1 May 11, 2023

(51) Int. Cl.
*D06B 9/06* (2006.01)
*B29B 17/02* (2006.01)
*D06B 23/20* (2006.01)

(52) U.S. Cl.
CPC ............... *D06B 9/06* (2013.01); *B29B 17/02* (2013.01); *D06B 23/205* (2013.01); *B29B 2017/0217* (2013.01)

(58) Field of Classification Search
CPC ............ B29B 17/02; B29B 2017/0217; B29B 2017/0293; D06B 23/205; D06B 9/06; B29K 2075/00; B29K 2995/0046; B29L 2031/726; C08J 11/08; C08J 2375/04; G03F 7/70258; G03F 7/70525; G03F 7/706; G03F 7/70891; Y02W 30/62
See application file for complete search history.

(56) References Cited

U.S. PATENT DOCUMENTS

2021/0079564 A1* 3/2021 Klaus-Nietrost ....... D01F 13/04

FOREIGN PATENT DOCUMENTS

| BR | 9301022 A | | 11/1994 |
| CN | 106279755 A | | 1/2017 |
| CN | 110790980 | * | 2/2020 |
| JP | 2011088943 A | | 5/2011 |
| WO | 2013/032408 A1 | | 3/2013 |
| WO | 2018/150028 A1 | | 8/2018 |

OTHER PUBLICATIONS

Chen et al, "Biomass-derived gamma-valerolactone: efficient dissolution adn accelerated alkaline hydrolysis of polyethylene terephthalate", vol. 23, No. 11, pp. 4065-4073; Jun. 9, 2021 (Year: 2021).*
Machine translation of CN 110790980, Xing et al, Feb. 14, 2020 (Year: 2020).*

* cited by examiner

*Primary Examiner* — Frances Tischler
(74) *Attorney, Agent, or Firm* — S&F/WEHRW

(57) ABSTRACT

Provided herein is a method of separating spandex from textile blends using biosolvents. The recovered material is of high purity while the chemical structure and molecular weight remain substantially unaffected by the treatment.

16 Claims, 3 Drawing Sheets

TEXTILE SEPARATION METHODS

TECHNICAL FIELD

The present disclosure relates to a method of separating spandex from blended textile substrates, facilitating the recycling and reuse of textile materials from pre- and post-consumer textile waste.

BACKGROUND

Textile waste is discharged in landfills or incinerated unless its constituents can be effectively separated for recycling and reuse. Spandex containing textile blends cannot be directly processed by existing textile recycling technology at a commercial or industrial scale.

There are four major types of elastomeric textile fibers and it is widely accepted that spandex is dominates the overall stretch yarn market with a reported market share of about 67%. Spandex was first invented in 1959 and its popularity has grown rapidly since then. The name 'spandex' is commonly used in the US and many other countries, while the term 'elastane' is preferred in Europe. Spandex is defined as a long chain synthetic polymer containing at least 85 wt % of segmented polyurethane that includes alternating soft polyester segments and hard polyurethane-urea segments. Spandex is well known by its exceptionally high elasticity (typically up to 500-600%), lightweight and good abrasion resistance. These superior performances have resulted in its wide applications in different apparel products. Typically, the addition of 1-25% spandex in apparel is sufficient to bring comfort and stretch. The popularity of spandex in apparel and increasing amount of spandex containing apparel waste has created a need to develop methods for recovering spandex from waste apparel.

To meet this need, a number of methods for separating spandex from textile blends have been developed. Three of them (BR 9301022, WO 2013032408 and JP 2011088943) are related to the separation of spandex from polyamide (nylon). The other two patents CN 106279755 and WO 2018150028 are related to the separation of spandex and polyester. BR 9301022 provides a method for the removal and recovery of nylon by dissolution in 5% formic acid. In WO 2013032408, removal of spandex from nylon is achieved by thermal degradation at 150-260° C., and in JP 2011088943 by the dissolution of spandex in 85% N-methylpyrrolidone aqueous solution. The two patents for polyester-spandex blends provides method of the removal of spandex by alcoholysis at high temperature and pressure (285° C. and 5 MPa) and by depolymerisation of polyester at 165° C. as in CN 106279755 and WO 2018150028, respectively.

None of the patents mentioned teach methods for separating spandex from cotton-spandex blends, which is one of the most common blends used in apparel, in some cases rely on toxic solvents for separation, and/or involve the depolymerisation of certain constituents.

There is thus a need to develop effective and environmentally friendly methods for separating spandex from pre- and post-consumer textile waste.

SUMMARY

The present disclosure relates to the separation of spandex from other textile materials, particularly polyester (PET), nylon, and cotton (and their blends). It is the aim of this study to develop a more environmentally friendly method to remove spandex from the blended textile substrate by using biosolvents, while keeping the other constituent materials intact. Biosolvents are derived from renewable biomass and are being studied as safer and more sustainable alternatives than petroleum-based solvents.

In a first aspect, provided herein is a method of separating spandex from a blended textile substrate comprising spandex and at least one other textile polymer, the method comprising: contacting the blended textile substrate with a biosolvent at a temperature between 80° C. to 150° C. thereby forming a treated textile substrate comprising the at least one other textile polymer and a biosolvent extract solution comprising the biosolvent and at least a portion of the spandex in the blended textile substrate; and separating the biosolvent extract solution and the treated textile substrate.

In certain embodiments, the at least one other textile polymer is selected from the group consisting of cotton, viscose, lyocell, nylon, polyester and blends thereof.

In certain embodiments, the at least one other textile polymer comprises cotton.

In certain embodiments, the blended textile substrate is a woven textile substrate, non-woven textile substrate, a knitted textile substrate, or a mixture thereof.

In certain embodiments, the biosolvent is a ketone, an ester, a carboxylic acid, an alcohol, an aldehyde, or a mixture thereof.

In certain embodiments, the biosolvent comprises between 5-7 carbon atoms.

In certain embodiments, the biosolvent is dihydrolevoglucosenone, ethyl levulinate, gamma-valerolactone, ethyl lactate, furfural, furfuryl alcohol, levulinic acid, or a mixture thereof.

In certain embodiments, the biosolvent is dihydrolevoglucosenone, ethyl levulinate and gamma-valerolactone, or a mixture thereof.

In certain embodiments, the blended textile substrate and the biosolvent are present in a mass ratio of about 1:20 to about 1:100, respectively.

In certain embodiments, the blended textile substrate and the biosolvent are present in a mass ratio of about 1:50, respectively.

In certain embodiments, the temperature is 120° C. to 140° C. and the step of contacting the blended textile substrate with the biosolvent occurs at atmospheric pressure.

In certain embodiments, the treated textile substrate contains less than 1% by weight of spandex.

In certain embodiments, the method further comprises the step of separating the spandex from the biosolvent extract solution thereby forming a recovered biosolvent and a recovered spandex.

In certain embodiments, the recovered biosolvent is reused in the method.

In certain embodiments, the average molecular weight of the at least one other textile polymer in the treated textile substrate is substantially unchanged from the average molecular weight of the at least one other textile polymer in the blended textile substrate.

In certain embodiments, the method comprises: contacting the blended textile substrate with a biosolvent selected from the group consisting of dihydrolevoglucosenone, ethyl levulinate, gamma-valerolactone and mixtures thereof, wherein the blended textile substrate and the biosolvent are present in a mass ratio of about 1:50, respectively; at a temperature between 120° C. to 140° C. thereby forming a treated textile substrate and a biosolvent extract solution comprising the biosolvent and at least a portion of the spandex in the blended textile substrate; and separating the biosolvent extract solution and the treated textile substrate.

In certain embodiments, the step of contacting the blended textile substrate with the biosolvent is conducted for 1-3 hours.

In certain embodiments, the at least one other textile polymer is PET, nylon, cotton, or blends thereof.

In certain embodiments, the method further comprises the step of separating the spandex from the biosolvent extract solution thereby forming a recovered biosolvent and a recovered spandex; and optionally reusing the recovered biosolvent in the method.

In certain embodiments, the molecular weight of at least one other textile polymer in the treated textile substrate is substantially unchanged from the molecular weight of the at least one other textile polymer in the blended textile substrate.

BRIEF DESCRIPTION OF THE DRAWINGS

The above and other objects and features of the present disclosure will become apparent from the following description of the disclosure, when taken in conjunction with the accompanying drawings.

DETAILED DESCRIPTION

Figure 1:
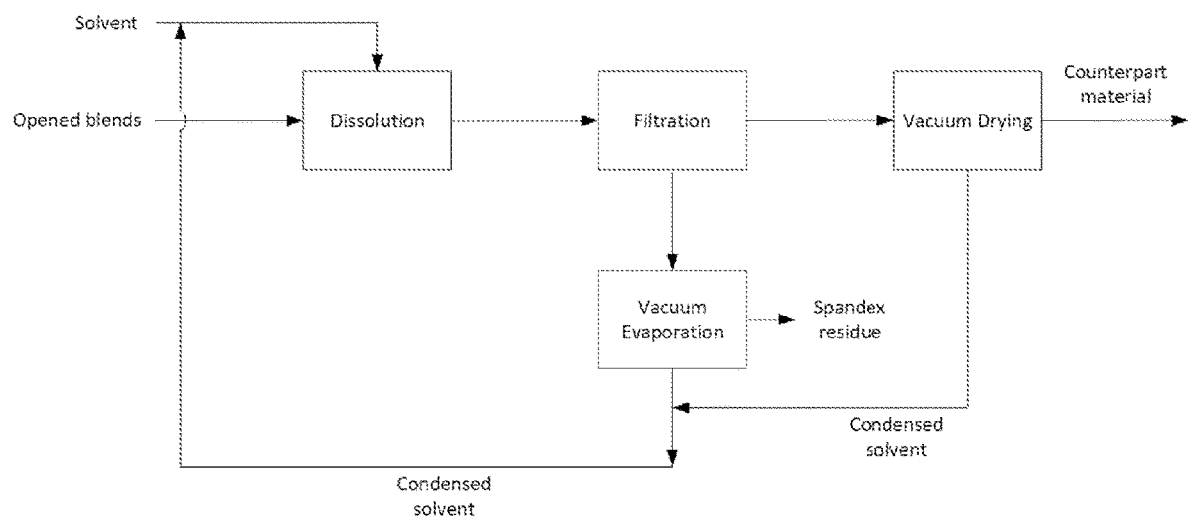
FIG. 1 depicts a flow diagram for the spandex separating process according to certain embodiments of the methods described herein

Throughout the present disclosure, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the present disclosure and claims, unless the context requires otherwise, the word "include" or variations such as "includes" or "including", will be understood to imply the inclusion of a stated integer or group of integers, but not the exclusion of any other integer or group of integers.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

The present disclosure provides a method of separating spandex from a blended textile substrate comprising spandex and at least one other textile polymer, the method comprising: contacting the blended textile substrate with a biosolvent at a temperature between 80° C. to 150° C. thereby forming a treated textile substrate comprising the at least one other textile polymer and a biosolvent extract solution comprising the biosolvent and at least a portion of the spandex in the blended textile substrate; and separating the biosolvent extract solution and the treated textile substrate.

The blended textile substrate can comprise spandex and at least one textile polymer. The at least one textile polymer can be any textile polymer known in the art. Exemplary textile polymers include, but are not limited to, cotton, viscose, lyocell, modal, cellulose triacetate, cupro, linen, hemp, ramie, bamboo, sisal, polyester [such as polyethylene terephthalate (PET)], nylon, cashmere, merino wool, mohair, qiviut, angora, alpaca, llama, camel hair, vicuna, aralac, silk, acrylic, and elastolefin. In certain embodiments, the at least one textile polymer is selected from the group consisting of cotton, viscose, lyocell, nylon, polyester, and blends thereof. In certain embodiments, the blended textile substrate comprises nylon and at least one textile polymer selected from the group consisting of PET, cotton, and nylon.

The blended textile substrate may comprise spandex in the amount between about 0.1% and about 30%, about 0.1% and about 25%, about 0.1% and about 20%, about 1% and about 20%, about 1% and about 15%, about 1% and about 10%, or about 1% and about 5% by weight.

The blended textile substrate is a woven textile substrate, non-woven textile substrate, a knitted textile substrate, or a mixture thereof.

The size of the blended textile substrate may also be optionally reduced prior to being subjected to the method described herein. The size of the blended textile substrate can be mechanically reduced using any method known in the art, such as by cutting, tearing, breaking, shredding, and/or other mechanical size reduction techniques. Advantageously, the reduction of the size of the blended textile substrate can increase the surface area of the blended textile substrate and assist in the isolation of spandex. In certain embodiments, the size of the blended textile substrate is reduced by using a textile opening machine.

In certain embodiments, the blended textile substrate is cleaned prior to being subjected to the methods described herein. The blended textile substrate can be cleaned using any method known in the art, such as by washing in a solvent and/or directed air flow to remove, e.g., non-fibrous material.

Biosolvents are derived from biomass, typically from cellulosic biomass, such as corn stover, saw grass or wood dust by different chemical processes. This emerging class of solvents is often investigated as alternative and replacement to traditional petroleum-based solvents as they offer advantages, such as being renewable and biodegradable. Because of the excellent solvating power of biosolvents for a wide range of chemicals, more applications for biosolvents in chemical processes are emerging.

In certain embodiments, the biosolvent comprises an organic solvent having or more functional groups selected from a ketone, an ester, a carboxylic acid, an alcohol, an aldehyde, and a mixture of biosolvents thereof. In certain embodiments, the biosolvent comprises at least 3 carbon atoms, at least 4 carbon atoms, or at least 5 carbon atoms. The biosolvent can comprise between 3-30 carbon atoms, 3-20 carbon atoms, 3-10 carbon atoms, 5-10 carbon atoms, 5-7 carbon atoms, 5-6 carbon atoms, or 6-7 carbon atoms.

Exemplary biosolvents include, but are not limited to dihydrolevoglucosenone, a levulinate C1-C6 alkyl ester, such as methyl levulinate, ethyl levulinate, or propyl levulinate, gamma-valerolactone, a lactate C1-C6 alkyl ester, such as methyl lactate, ethyl lactate, and propyl lactate, furfural, furfuryl alcohol, levulinic acid, or a mixture thereof. In certain embodiments, the biosolvent is selected from the group consisting of dihydrolevoglucosenone, ethyl levulinate and gamma-valerolactone, and mixtures thereof.

The blended textile substrate and the biosolvent can be present in a ratio of about 1:10 to about 1:100; about 4:50 to about 1:100; about 3:50 to about 1:100; about 2:50 to about 1:100; about 3:100 to about 1:100; or about 1:50, respectively.

The step of contacting the blended textile substrate with a biosolvent can occur at a temperature between about 80° C. to about 150° C., about 90° C. to about 150° C., about 100° C. to about 150° C., about 110° C. to about 150° C., about 120° C. to about 150° C., about 120° C. to about 140° C., about 120° C., or about 140° C.

In general, the amount of time that the blended textile substrate and the biosolvent are allowed to remain in contact for can depend on a number of parameters, such as the composition of the blended textile substrate, the surface area of the blended textile substrate, the choice of biosolvent, the temperature that the biosolvent extraction step is conducted at, and the mass ratio of the blended textile substrate to the biosolvent. The selection of the appropriate time that the blended textile substrate and the biosolvent are allowed to remain in contact is well within the skill of a person of ordinary skill in the art. In certain embodiments, the blended textile substrate and the biosolvent are allowed to remain in contact for about 30 minutes to about 5 hours, about 1 hour to about 5 hours, about 1 hour to about 4 hours, about 1 hour to about 3 hours, about 1.5 hour to about 3 hours, about 2.5 hour to about 3 hours, about 1.5 hours, about 2.5 hours, or about 2.9 hours.

The treated textile substrate can be separated from the biosolvent extraction solution by filtration. The treated textile substrate can then be optionally washed water and dried. In certain embodiments, the treated textile substrate can comprise less than about 5%, less than about 4%, less than about 3%, less than about 2%, less than about 1%, less than about 0.5%, less than about 0.1% by weight of spandex.

The spandex can be recovered from the biosolvent extraction solution by any number of methods, such as by distilling the biosolvent from the biosolvent extraction solution thereby yielding the recovered spandex.

Blended textile substrates, such as reclaimed garments and textiles typically incorporate a variety of dyes and/or chemical finishes and may be contaminated with other materials, such as dirt, grease, and the like. The blended textile substrate can optionally be processed in one or more pre-treatment stage(s) to remove dyes, finishes, contaminants (oils, grease, etc.) and the like from blended textile substrate. Processing to remove non-textile components, such as buttons, zippers, fasteners, and the like may take place, if desired, prior to the methods described herein.

As demonstrated in the examples below, the method described herein advantageously produces recovered textile materials from the blended textile substrate with relatively unchanged molecular weights and the FTIR data of the recovered textile materials (FIG. 2) show no substantial decomposition products.

The process flow diagram is presented in FIG. 1. The dissolution temperature can be kept below the respective boiling point of the biosolvent. The treated solid material will be collected by filtration and drying. Used solvent can be recovered by vacuum evaporation for reuse. Spandex typically constitutes less than 25% by mass of textile blends, and in many cases lower than 5% by mass, it is therefore more logical to focus on the recovery of the higher volume (and hence higher value) among the constituent materials (e.g. PET, nylon and cotton). With this concept in mind, the dissolution of spandex with some degree of degradation of spandex can be accepted. Residual spandex collected during the solvent recovery process can be potentially used as adhesive. Zero waste is generated by this treatment process. For petroleum-based solvent, spandex can be dissolved in polar aprotic solvents, such as dimethylformamide (DMF) and dimethylacetamide (DMAc), which are both potential carcinogens. Some examples of polar aprotic biosolvents used in the methods described herein include Cyrene™ (dihydrolevoglucosenone), ethyl levulinate and gamma-valerolactone,

EXAMPLES

Example 1

Fabric was first opened by fabric opening machine. Solid to liquid ratio was kept at 1:50. After treatment, rinsing of samples with the same solvent at room temperature during the filtration step is performed to remove surface residue. Recovered material is dried by vacuum drying at 100° C. for 1.5 hours. Composition of the original sample and recovered sample are determined according to AATCC 20A-2018. Molecular weight of the recovered material is by gel permeation chromatography (GPC).

| Original Fabric | Treatment | | Recovered Material | | |
| --- | --- | --- | --- | --- | --- |
| | Solvent | Conditions | Composition | Mn | Mw |
| PET-Spandex (90.7%/9.3%) | Dihydrolevoglucosenone | 140° C., 2.5 hrs | PET (100%) | 17,048 | 48,856 |
| | Ethyl Levulinate | 120° C., 2.9 hrs | PET (100%) | 16,389 | 43,864 |
| | Gamma-valerolactone | 120° C., 1.5 hrs | PET (100%) | 15,456 | 44,140 |

| Original | Treatment | | Recovered Material | | |
|---|---|---|---|---|---|
| Fabric | Solvent | Conditions | | Mn | Mw |
| Nylon-Spandex (89.2%/10.8%) | Dihydrolevoglucosenone | 140° C., 2.5 hrs | Nylon (100%) | 24,454 | 62,529 |
| | Ethyl Levulinate | 120° C., 2.9 hrs | Nylon (100%) | 20,988 | 54,199 |
| | Gamma-valerolactone | 120° C., 1.5 hrs | Nylon (100%) | 27,538 | 66,364 |

| Original | Treatment | | Recovered Material | | |
|---|---|---|---|---|---|
| Fabric | Solvent | Conditions | Composition | Mn | Mw |
| Cotton-Spandex (93.9%/6.1%) | Dihydrolevoglucosenone | 140° C., 2.5 hrs | Cotton (100%) | 203,975 | 365,629 |
| | Ethyl Levulinate | 120° C., 2.9 hrs | Cotton (100%) | 227,743 | 409,224 |
| | Gamma-valerolactone | 120° C., 1.5 hrs | Cotton (100%) | 207,322 | 371,762 |

Example 2

Figure 2:
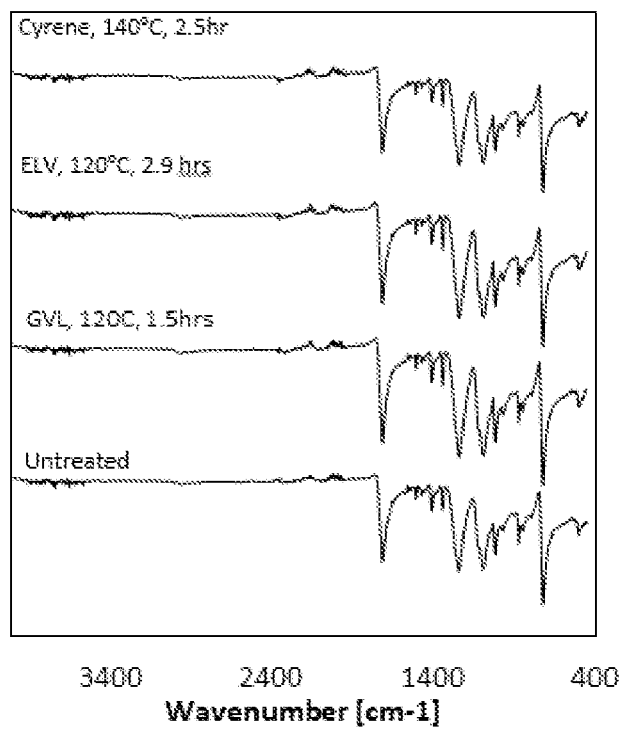
FIG. 2 depicts a Fourier-transform infrared spectroscopy (FTIR) spectrum of untreated and treated samples of (A) polyester, (B) nylon, and (C) cotton samples.
Figure 2:
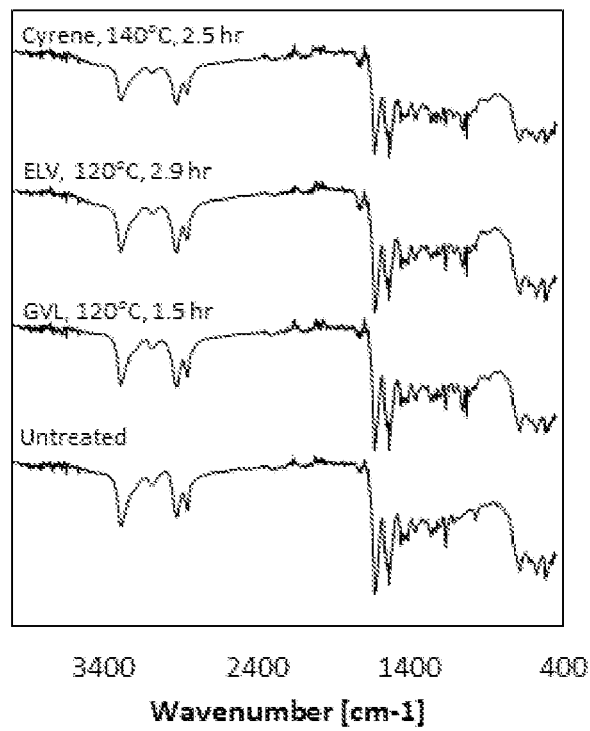
Figure 2:
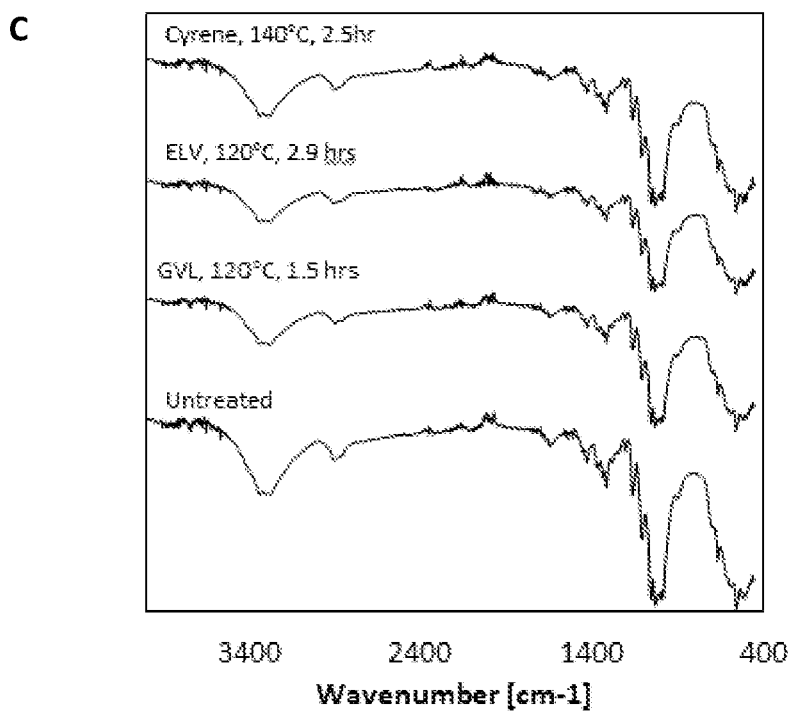

To confirm if the chemical structure and molecular weight of polyester, nylon and cotton is affected by the treatment, textile samples of 100% purity (without spandex) were tested at the same conditions as the separation treatment. The chemical structure of the recovered samples was analyzed by FTIR as shown in FIG. 2. Molecular weights of the material before and after treatment were checked. No change in both chemical peaks and decrease in molecular weight was observed.

| | Treatment | 100% PET | | 100% Nylon | | 100% Cotton | |
|---|---|---|---|---|---|---|---|
| Solvent | Conditions | Mn | Mw | Mn | Mw | Mn | Mw |
| — | Untreated | 8,961 | 20,576 | 12,990 | 23,410 | 142,601 | 253,612 |
| Dihydrolevoglucosenone | 140° C., 2.5 hrs | 11,973 | 26,675 | 16,246 | 30,550 | 139,609 | 248,175 |
| Ethyl Levulinate | 120° C., 2.9 hrs | 12,744 | 25,826 | 13,870 | 23,972 | 174,594 | 311,896 |
| Gamma-valerolactone | 120° C., 1.5 hrs | 13,906 | 28,524 | 16,578 | 31,134 | 178,860 | 319,686 |

What is claimed is:

1. A method of separating spandex from a blended textile substrate comprising spandex and at least one other textile polymer, the method comprising: contacting the blended textile substrate with a biosolvent at a temperature between 80° C. to 150° C. thereby forming a treated textile substrate comprising the at least one other textile polymer and a biosolvent extract solution comprising the biosolvent and at least a portion of the spandex in the blended textile substrate; and separating the biosolvent extract solution and the treated textile substrate, wherein the biosolvent is dihydrolevoglucosenone, ethyl levulinate, gamma-valerolactone, or a mixture thereof.

2. The method of claim 1, wherein the at least one other textile polymer is selected from the group consisting of cotton, viscose, lyocell, nylon, polyester and blends thereof.

3. The method of claim 1, wherein the at least one other textile polymer comprises cotton.

4. The method of claim 1, wherein the blended textile substrate is a woven textile substrate, non-woven textile substrate, a knitted textile substrate, or a mixture thereof.

5. The method of claim 1, wherein the blended textile substrate and the biosolvent are present in a mass ratio of about 1:20 to about 1:100, respectively.

6. The method of claim 1, wherein the blended textile substrate and the biosolvent are present in a mass ratio of about 1:50, respectively.

7. The method of claim 1, wherein the temperature is 120° C. to 140° C. and the step of contacting the blended textile substrate with the biosolvent occurs at atmospheric pressure.

8. The method of claim 1, wherein the treated textile substrate contains less than 1% by weight of spandex.

9. The method of claim 1 further comprising the step of separating the spandex from the biosolvent extract solution thereby forming a recovered biosolvent and a recovered spandex.

10. The method of claim 9, wherein the recovered biosolvent is reused in the method.

11. The method of claim 9, wherein the average molecular weight of the at least one other textile polymer in the treated textile substrate is substantially unchanged from the average molecular weight of the at least one other textile polymer in the blended textile substrate.

12. The method of claim 1, wherein the method comprises: contacting the blended textile substrate with a biosolvent selected from the group consisting of dihydrolevoglucosenone, ethyl levulinate, gamma-valerolactone and mixtures thereof, wherein the blended textile substrate and the biosolvent are present in a mass ratio of about 1:50, respectively; at a temperature between 120° C. to 140° C. thereby forming a treated textile substrate and a biosolvent extract solution comprising the biosolvent and at least a portion of the spandex in the blended textile substrate; and separating the biosolvent extract solution and the treated textile substrate.

13. The method of claim 12, wherein the step of contacting the blended textile substrate with the biosolvent is conducted for 1-3 hours.

14. The method of claim 12, wherein the at least one other textile polymer is PET, nylon, cotton, or blends thereof.

15. The method of claim 12 further comprising the step of separating the spandex from the biosolvent extract solution thereby forming a recovered biosolvent and a recovered spandex; and optionally reusing the recovered biosolvent in the method.

16. The method of claim 12, wherein the molecular weight of at least one other textile polymer in the treated textile substrate is substantially unchanged from the molecular weight of the at least one other textile polymer in the blended textile substrate.

* * * * *